United States Patent
Kim et al.

(10) Patent No.: US 7,724,635 B2
(45) Date of Patent: May 25, 2010

(54) RECORDING MEDIUM HAVING EFM DEMODULATION UNIT FOR ADAPTIVELY RE-ALIGNING EFM DEMODULATION POINT, DEVICE AND METHOD FOR PLAYING THE SAME

(75) Inventors: Dae-Woong Kim, Seoul (KR); Hyun Woong Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1256 days.

(21) Appl. No.: 11/102,310

(22) Filed: Apr. 8, 2005

(65) Prior Publication Data

US 2005/0249067 A1 Nov. 10, 2005

(30) Foreign Application Priority Data

May 4, 2004 (KR) .................. 10-2004-0031351

(51) Int. Cl.
*G11B 7/004* (2006.01)
(52) U.S. Cl. .................. 369/124.04; 369/47.19
(58) Field of Classification Search ............ 369/47.1, 369/47.19, 124.04, 59.1, 59.23
See application file for complete search history.

(56) References Cited

U.S. PATENT DOCUMENTS

| | | | | |
|---|---|---|---|---|
| 5,856,962 A | * | 1/1999 | Inagawa et al. | 369/47.19 |
| 6,118,393 A | * | 9/2000 | Chiba et al. | 341/61 |
| 6,414,918 B1 | * | 7/2002 | Tanaka et al. | 369/47.24 |
| 6,587,411 B2 | * | 7/2003 | Hayashi | 369/47.29 |
| 6,928,038 B2 | * | 8/2005 | Tsai et al. | 369/47.28 |
| 2002/0018417 A1 | * | 2/2002 | Morishima | 369/47.53 |
| 2002/0071363 A1 | * | 6/2002 | Koudo et al. | 369/47.48 |
| 2003/0063532 A1 | * | 4/2003 | Yamada et al. | 369/44.36 |
| 2004/0052173 A1 | * | 3/2004 | Hsu | 369/47.3 |
| 2004/0130985 A1 | * | 7/2004 | Chao | 369/47.31 |

FOREIGN PATENT DOCUMENTS

| | | |
|---|---|---|
| JP | 8-069665 | 3/1996 |
| JP | 2002150718 | 5/2002 |
| KR | 100286281 | 1/2001 |

* cited by examiner

*Primary Examiner*—Thang V Tran
*Assistant Examiner*—Thomas D Alunkal
(74) *Attorney, Agent, or Firm*—F. Chau & Associates, LLC

(57) ABSTRACT

Provided are a recording medium, a recording medium playing device and method, which has an EFM demodulation unit for adaptively realigning an EFM demodulation point. The recording medium demodulates first data into second data in response to a channel clock signal recovered from the first data, compares a demodulation point indicating demodulation of the first data into the second data with an alignment point set in response to the first data, and jumps the demodulation point forward or backward by a difference between the demodulation point and the alignment point.

10 Claims, 4 Drawing Sheets

RECORDING MEDIUM HAVING EFM DEMODULATION UNIT FOR ADAPTIVELY RE-ALIGNING EFM DEMODULATION POINT, DEVICE AND METHOD FOR PLAYING THE SAME

CROSS-REFERENCE TO RELATED APPLICATION

This application claims the priority of Korean Patent Application No. 2004-31351, filed on May 4, 2004, in the Korean Intellectual Property Office, the disclosure of which is incorporated herein in its entirety by reference.

BACKGROUND OF THE INVENTION

1. Field of the Invention

The present disclosure relates to recording media and, more particularly, to recording media with eight to fourteen modulation (EFM) demodulation.

2. Description of the Related Art

Techniques of digitalizing a video signal, storing the digital video signal in a recording medium, and reproducing the digital video signal recorded in the recording medium have been studied. In general, a video signal has a much larger quantity of information than the quantity of information of an audio signal. Thus, a recording medium for storing the video signal requires a larger capacity and higher operating speed. In addition, the video signal needs to be compressed.

Attention has been focused on a digital versatile (or video) disc (DVD) technology because the DVD provides a picture quality and reproducing time better than those of a CD-ROM. Furthermore, Joint Photographic Experts Group (JPEG) and Moving Picture Experts Group (MPEG) versions 1 and 2 are well known in the art as techniques for compressing video signals and storing the compressed video signals in a recording medium such as a DVD.

A data format for the DVD is different from a data format for the CD-ROM. The data format for the DVD includes a sector composed of predetermined digital signal units. The sector is divided into a plurality of frames, such as 26 frames, for example. Each of the frames includes a synchronous signal in addition to a modulated digital video signal and an error correction code.

FIG. 1 illustrates the data format of a DVD or DVD-R/RW indicated generally by the reference numeral 100. Referring to FIG. 1, an ECC block 110, which is a logical read unit, has 16 sectors. Each of the sectors is divided into 26 synchronization frames including 0th synchronization frame through 25th synchronization frame. Each of the frames has a synchronization part SYNC and a data part. The data part is divided into a 16-byte sub data region and a 69- to 70-byte main data region. The sub data region includes a sector number, a 4-byte ID region representing information of the layer and region of the sector, a 2-byte IED region representing a parity for detecting an error of ID, a 6-byte CPR_MAI region representing system reservation data such as copy guard information, and a 4-byte buffering region allocated for overcoming restrictions caused by accurate control of a spindle motor according to a DVD recording specification.

In the case of an incremental recording mode of the DVD-R and DVD-RW, that is, when data transmission is instantaneously interrupted or new data is recorded following previous data, a linking scheme that allocates a predetermined number of bytes, such as three bytes, to a buffering region of the next recording starting point is used. Accordingly, the fifteenth byte through seventeenth byte of the buffering region becomes a linking region.

Since constant linear velocity (CLV) is employed as a method of controlling the driving of a DVD, it is required to recover a channel clock signal of a frequency corresponding to a bit period of a signal reproduced from the DVD by an optical system in order to demodulate the reproduced signal. The channel clock signal is recovered by a phase locked loop (PLL). The channel clock signal is recovered by inputting a signal read from the disc to the PLL.

FIG. 2 illustrates the order of demodulating eight to fourteen modulation (EFM) input data read from a DVD, as indicated generally by the reference numeral 200. Referring to FIG. 2, a frame synchronization signal FrameSync of the EFM data is detected in response to a channel clock signal recovered by a PLL circuit, as indicated by portion A. A frame counter is reset to zero in response to the detected frame synchronization signal. The frame counter is increased by one for each channel clock. Whenever the frame counter value becomes 16, that is, whenever lower 4 bits are 0000, a value matched with 16-bit data is obtained from a look-up table and EFM+ demodulation is carried out 91 times, as indicated by portion B. When the frame synchronization signal is detected again, the operation of resetting the frame counter, increasing the frame counter by one for each channel clock and performing the EFM+ demodulation whenever the frame counter value becomes 16 is repeated.

The EFM+ demodulation can be carried out without having an error only when the EFM data and the channel clock signal are correctly aligned with each other. If the channel clock signal leads the EFM data by one clock, that is, when the frame counter value is increased by more than +1 or the EFM input data is misaligned by one channel clock, a modulation point mismatch results in erroneous demodulation.

After a defect point caused by damage on the surface a disc, the operation of a clock recovery phase locked loop is out of a normal state. Accordingly, a channel clock frequency is increased or decreased and thus the frame counter value becomes inaccurate. As a result, a maximum of 91 erroneous demodulations of EFM data occur in a single frame.

Therefore, a device and method are desired for adaptively correcting a demodulation point to reproduce digital flash media (DFM) data, for example, when the channel clock is misaligned with the EFM data.

SUMMARY OF THE INVENTION

An embodiment of the present disclosure provides a recording medium that re-aligns a demodulation point misaligned with a channel clock signal.

Another embodiment of the present disclosure provides a recording medium playing device that adaptively aligns a demodulation point misaligned with a channel clock.

A further embodiment of the present disclosure provides a recording medium playing method of jumping a demodulation point indicating demodulation of EFM input data into DFM demodulation data forward or backward.

According to an aspect of the present disclosure, there is provided a recording medium, which demodulates first data into second data in response to a channel clock signal recovered from the first data, compares a demodulation point indicating demodulation of the first data into the second data with an alignment point set in response to the first data, and jumps the demodulation point forward or backward by a difference between the demodulation point and the alignment point.

According to another aspect of the present disclosure, there is provided a recording medium playing device comprising a frame counter providing an alignment point set in response to received EFM input data and counting pulses of a channel clock signal to generate a predetermined demodulation point; an input capture part serially receiving the EFM input data and storing the EFM data in parallel; an EFM demodulation table outputting EFM demodulation data corresponding to the parallel data in response to the demodulation point; and a forward/backward jumping block adaptively aligning the demodulation point with the channel clock signal according to a result of comparison of the alignment point with the demodulation point.

According to another aspect of the present disclosure, there is provided a recording medium playing method comprising recovering a channel clock signal in response to received first data; counting pulses of the channel clock signal to generate a demodulation point indicating demodulation of the first data into second data; comparing an alignment point set in response to the first data with the demodulation point; and jumping the demodulation point forward or backward by a difference between the alignment point and the demodulation point.

According to preferred embodiments of the present disclosure, the demodulation point is adaptively realigned when the channel clock signal is misaligned with the EFM input data, to convert the EFM input data into the EFM demodulation data.

BRIEF DESCRIPTION OF THE DRAWINGS

The above and other features and advantages of the present disclosure will become more apparent by describing in detail exemplary embodiments thereof with reference to the attached drawings, in which.

DETAILED DESCRIPTION OF PREFERRED EMBODIMENTS

Figure 1:
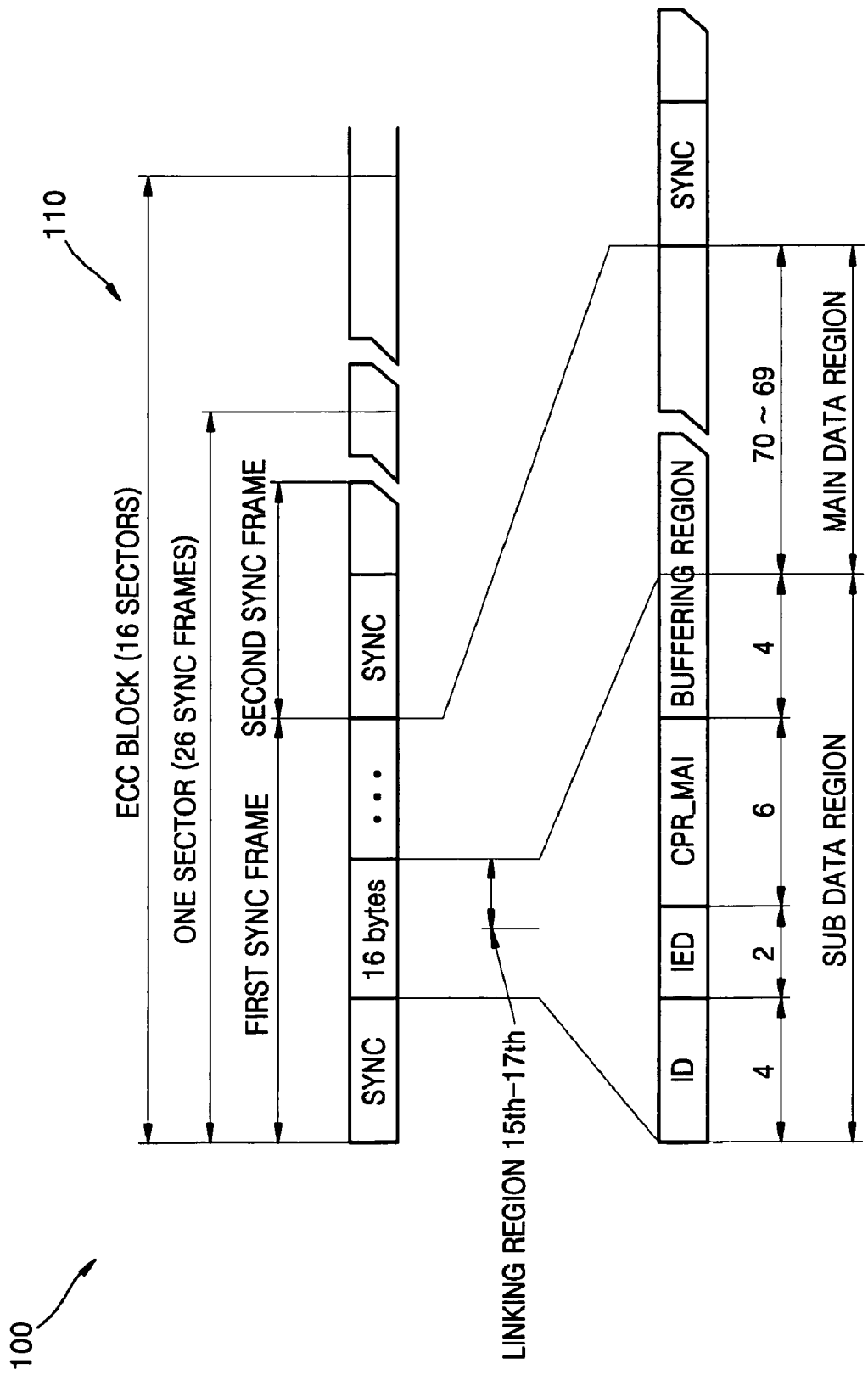
FIG. 1 is a schematic data diagram that illustrates a data format of a DVD or DVD-R/RW.
Figure 2:
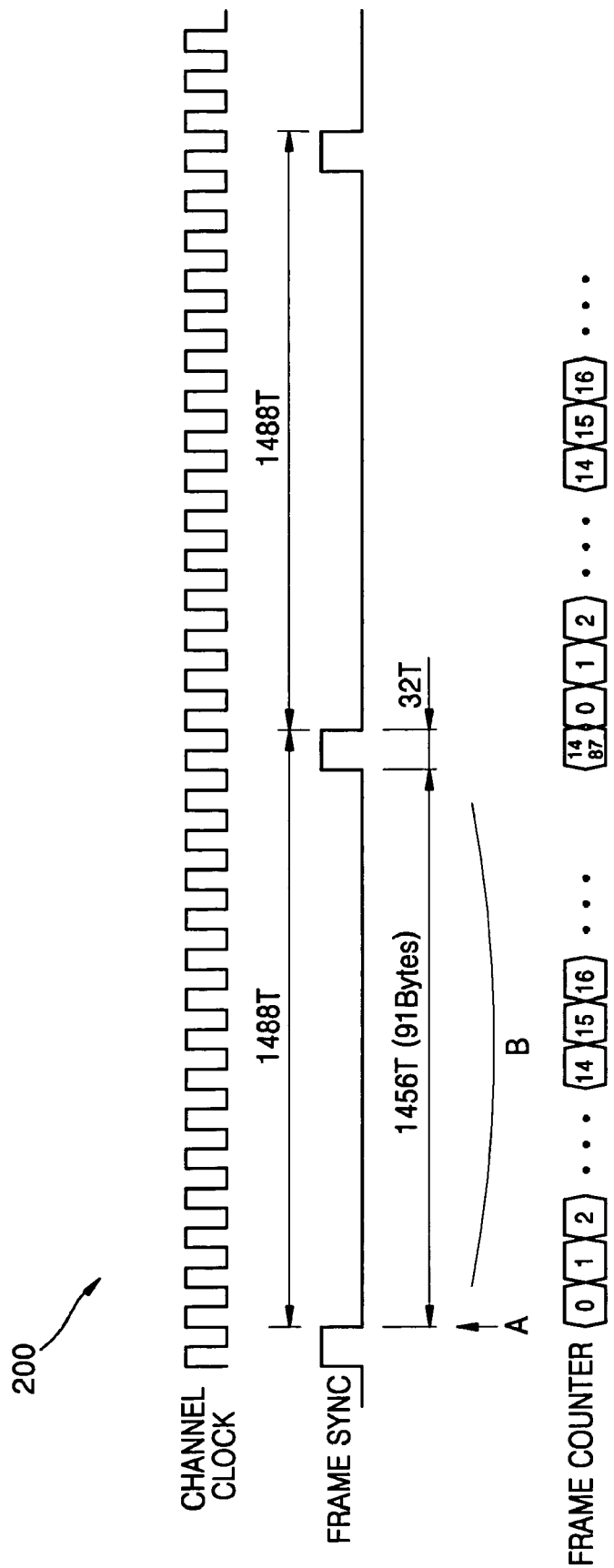
FIG. 2 is a timing diagram that illustrates the order of demodulating EFM data read from a DVD.

The present disclosure will now be described more fully with reference to the accompanying drawings, in which exemplary embodiments of the disclosure are shown. The invention may, however, be embodied in many different forms and should not be construed as being limited to the embodiments set forth herein; rather, these embodiments are provided so that this disclosure will be thorough and complete, and will fully convey the concepts to those of ordinary skill in the pertinent art. Throughout the drawings, like reference numerals may refer to like elements.

Figure 3:
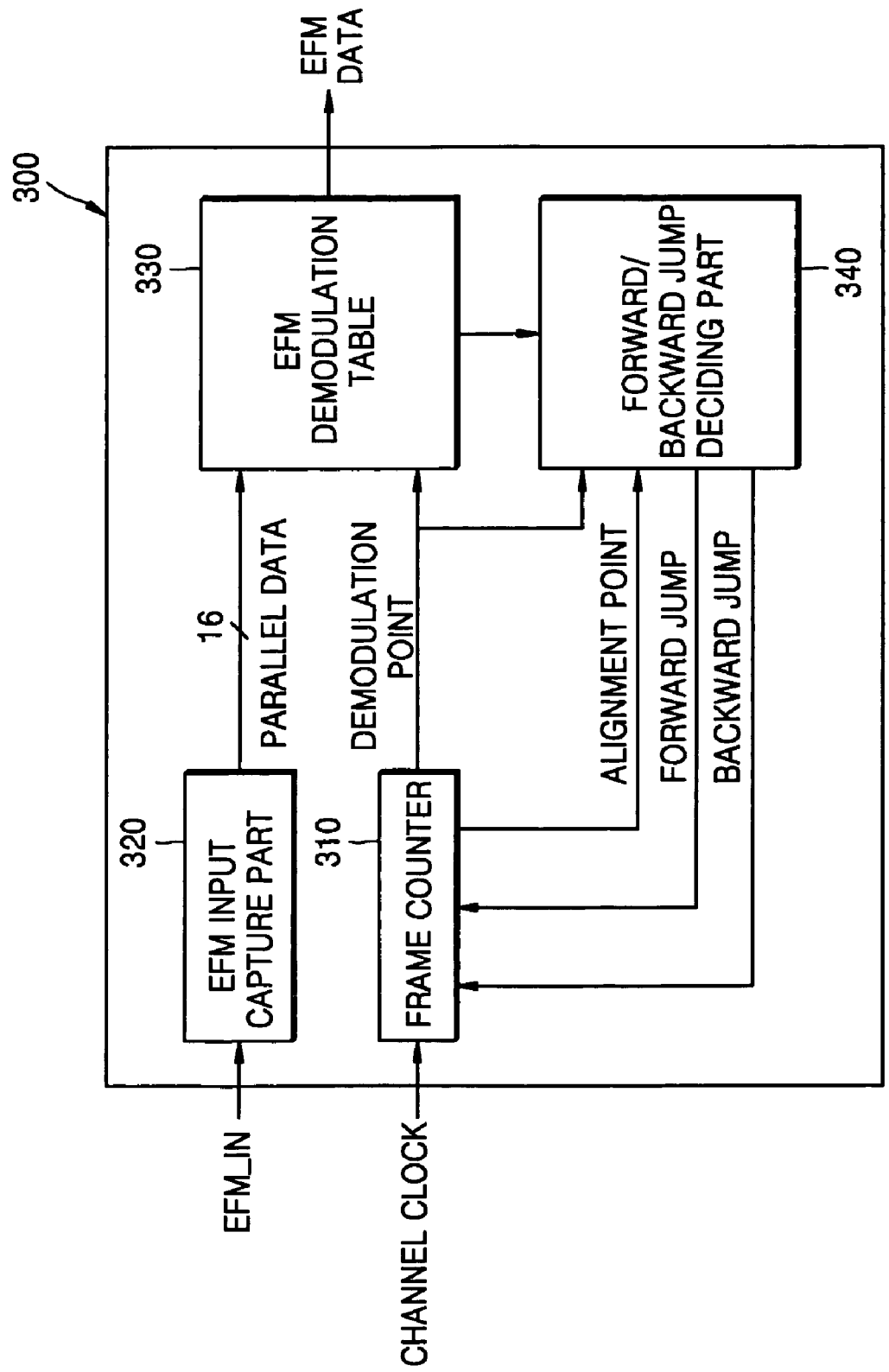
FIG. 3 is a schematic block diagram of an EFM demodulation unit included in a recording medium playing device according to an embodiment of the present disclosure.

FIG. 3 is a block diagram of an eight to fourteen modulation (EFM) demodulation unit indicated generally by the reference numeral 300, which is included in a recording medium playing device according to an exemplary embodiment of the present disclosure. Referring to FIG. 3, the EFM demodulation unit 300 includes a frame counter 310, an input capture part 320, an EFM demodulation table 330, and a forward/backward jump deciding part 340.

The frame counter 310 provides an alignment point set in response to EFM input data EFM_IN and counts channel clocks recovered by a PLL circuit (not shown) to generate a predetermined demodulation point. The alignment point is 14 when the EFM input data EFM_IN is an EFM signal and the alignment point is 16 when the EFM input data is an EFM+ signal.

The EFM input capture part 320 receives the EFM input data EFM_IN serially, stores the EFM input data DFM_IN in parallel, and then provides the EFM input data EFM_IN to the EFM demodulation table 330 in response to the demodulation point provided by the frame counter 310. The EFM demodulation table 330 stores EFM demodulation data corresponding to the EFM input data EFM_IN. A 14-to-8 conversion demodulation signal is stored in the EFM demodulation table 330 when the EFM input data EFM_IN is an EFM signal and a 16-to-8 conversion demodulation signal is stored therein when the EFM input data EFM_IN is an EFM+ signal.

The forward/backward jump deciding part 340 compares the alignment point with the demodulation point and jumps the value of the frame counter 310 forward or backward in response to the comparison result.

Figure 4:
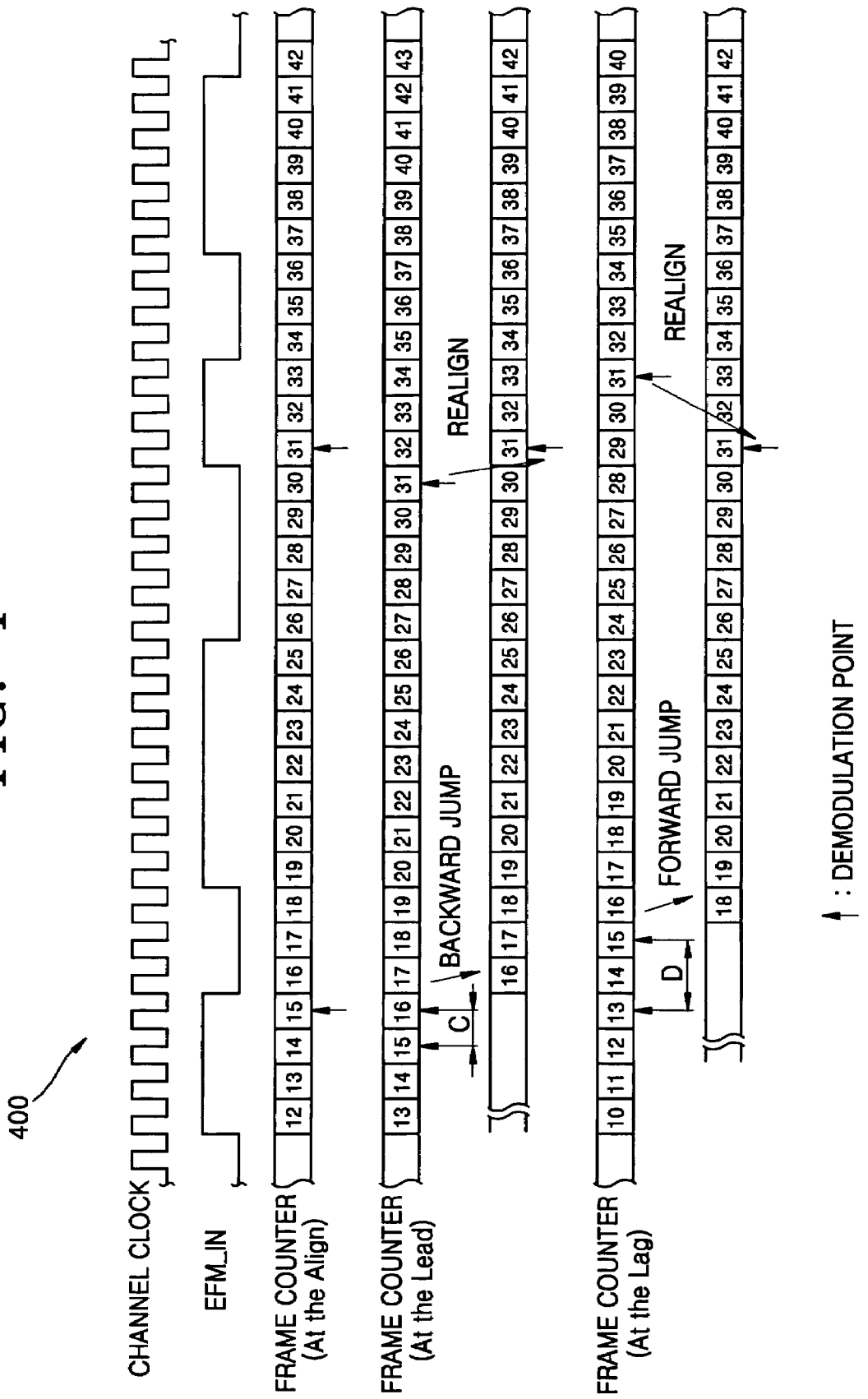
FIG. 4 is a timing diagram that illustrates a forward/backward jumping operation of the EFM demodulation unit of FIG. 3.

FIG. 4 illustrates a timing diagram, indicated generally by the reference numeral 400, for a forward/backward jumping operation of the EFM demodulation unit 300 of FIG. 3. Referring to FIG. 4, when the channel clock signal and the EFM input data EFM_IN are correctly aligned with each other, as shown in the "At the Align" instance of the frame counter, the pulses of the channel clock signal are counted to convert the EFM input data EFM_IN into EFM demodulation data when the demodulation point corresponds to 15, 31, 47, 63 and 79.

When the channel clock signal leads the EFM input data EFM_IN, as shown in the "At the Lead" instance of the frame counter, that is, when the demodulation point of the frame counter is 16, the demodulation point is jumped backward by a difference C between the demodulation point and the alignment point, that is, 15−16=−1. Then, the demodulation point is realigned to 31, 47, 63 and 79, and the EFM input data EFM_IN is converted into the EFM demodulation data.

When the channel clock signal lags behind the EFM input data EFM_IN, as shown in the "At the Lag" instance of the frame counter, that is, when the demodulation point of the frame counter is 13, the demodulation point is jumped forward by a difference D between the demodulation point and the alignment point, that is, 15−13=+2. Then, the demodulation point is realigned to 31, 47, 63 and 79, and the EFM input data EFM_IN is converted into the EFM demodulation data.

While the aforementioned embodiment describes that the channel clock signal is misaligned with the EFM input data at the first demodulation pointer, even when the misalignment occurs at other demodulation pointers the demodulation pointers are realigned in the same manner.

Thus, this embodiment of the present disclosure compares the alignment point to the demodulation point when the channel clock signal is misaligned with the modulation point and jumps the frame counter forward or backward by a difference between the alignment point and the demodulation point. Accordingly, even if a misaligned demodulation point is generated in a single frame, following demodulation points are realigned into the alignment point to convert EFM input data into EFM demodulation data.

While the present invention has been particularly shown and described with reference to exemplary embodiments thereof, it will be understood by those of ordinary skill in the pertinent art that various changes in form and details may be made therein without departing from the spirit and scope of the present invention as defined by the following claims.

What is claimed is:

1. A recording medium playing device comprising:
    a frame counter for providing an alignment point set in response to received EFM input data and counting pulses of a channel clock signal to generate a predetermined demodulation point of a frame counter;
    an input capture part for serially receiving the EFM input data and storing the EFM data in parallel;
    an EFM demodulation table in signal communication with the frame counter and the input capture part for outputting EFM demodulation data corresponding to the parallel data in response to the demodulation point; and
    a forward/backward jumping block in signal communication with the frame counter and the EFM demodulation table for adaptively aligning the demodulation point with the channel clock signal according to a result of comparison of the alignment point with the demodulation point,
    wherein the alignment point is set whenever the value of the frame counter is a multiple of 14 when the EFM input data is an EFM signal or a multiple of 16 when the EFM input data is an EFM+ signal, and
    wherein the jumped demodulation point corrects a random misalignment by an integer number of channel clock pulses between the frame counter responsive to the EFM input data and the channel clock signal to substantially prevent erroneous demodulation.

2. The recording medium playing device as claimed in claim 1, wherein the alignment point is set whenever the lower 4 bits of the value of the frame counter are 1111.

3. The recording medium playing device as claimed in claim 1, wherein the parallel data is 16-bit data when the EFM input data is an EFM+ signal.

4. The recording medium playing device as claimed in claim 1, wherein the parallel data is 14-bit data when the EFM input data is an EFM signal.

5. A recording medium playing method comprising:
    recovering a channel clock signal in response to received first data;
    counting pulses of the channel clock signal to generate a demodulation point of a frame counter indicating demodulation of the first data into second data;
    comparing an alignment point set in response to the first data with the demodulation point; and
    jumping the demodulation point forward or backward by a difference between the alignment point and the demodulation point,
    wherein the alignment point is set whenever a count of pulses of the channel clock signal is a multiple of 14 when the first data is an EFM signal or a multiple of 16 when the first data is an EFM+ signal, and
    wherein the jumped demodulation point corrects a random misalignment by an integer number of channel clock pulses between the frame counter responsive to the EFM input data and the channel clock signal to substantially prevent erroneous demodulation.

6. The recording medium playing method as claimed in claim 5, wherein the first data is an 8-to-14 modulated EFM signal.

7. The recording medium playing method as claimed in claim 6, wherein the second data is a 14-to-8 demodulated EFM signal.

8. The recording medium playing method as claimed in claim 5, wherein the first data is an 8-to-16 modulated EFM+ signal.

9. The recording medium playing method as claimed in claim 8, wherein the second data is a 16-to-8 demodulated BFM+ signal.

10. A recording medium playing device comprising:
    demodulation means for recovering a channel clock signal in response to received first data;
    counter means in signal communication with the demodulation means for counting pulses of the channel clock signal to generate a demodulation point indicating demodulation of the first data into second data;
    comparison means in signal communication with the demodulation means for comparing an alignment point set in response to the first data with the demodulation point; and
    jump means in signal communication with the comparison means for jumping the demodulation point forward or backward by a difference between the alignment point and the demodulation point,
    wherein the alignment point is set whenever a count of pulses of the channel clock signal is a multiple of 14 when the first data is an EFM signal or a multiple of 16 when the first data is an EFM+ signal, and
    wherein the jumped demodulation point corrects a random misalignment by an integer number of channel clock pulses between the frame counter responsive to the EFM input data and the channel clock signal to substantially prevent erroneous demodulation.

* * * * *